United States Patent [19]

Nakamura

[11] Patent Number: 4,891,639
[45] Date of Patent: Jan. 2, 1990

[54] MONITORING SYSTEM OF NETWORK

[75] Inventor: Yasuo Nakamura, Yokohama, Japan

[73] Assignee: Canon Kabushiki Kaisha, Tokyo, Japan

[21] Appl. No.: 210,313

[22] Filed: Jun. 23, 1988

[30] Foreign Application Priority Data

Jul. 1, 1987 [JP] Japan .................. 62-162475

[51] Int. Cl.<sup>4</sup> .......................... H04J 3/02; G06F 11/00
[52] U.S. Cl. ..................... 340/825.500; 340/825.050;
340/825.060; 340/825.070; 370/85.2; 371/8.2;
371/20.4
[58] Field of Search ....................... 370/13, 16, 88, 86,
370/85; 340/825.5, 825.05, 825.07, 825.08,
825.51, 825.06, 825.52; 371/22, 8, 32

[56] References Cited

U.S. PATENT DOCUMENTS

| | | | |
|---|---|---|---|
| 4,304,001 | 12/1981 | Cope | 371/8 |
| 4,495,493 | 1/1985 | Segarra et al. | 340/825.05 |
| 4,527,270 | 7/1985 | Sweeton | 370/88 |
| 4,583,089 | 4/1986 | Cope | 340/825.5 |
| 4,649,535 | 3/1987 | Ulug | 370/86 |
| 4,680,581 | 7/1987 | Kozlik et al. | 340/825.5 |
| 4,701,910 | 10/1987 | Ulug | 340/825.5 |

Primary Examiner—Donald J. Yusko
Assistant Examiner—Eric Pudpud
Attorney, Agent, or Firm—Fitzpatrick, Cella, Harper & Scinto

[57] ABSTRACT

There is provided a network monitoring system in which nodes are connected to the LAN as a communication medium using the token passing method and only the node to which the communication right was transferred can acquire the data communication right. The node has a communication right transfer instruction discriminating circuit, provided for each node, for discriminating a communication right transfer instruction sent through the LAN; an LAN monitoring instruction discriminating circuit, provided for each node, for discriminating an LAN monitoring instruction sent through the LAN; and a controller. When one of the nodes discriminates the LAN monitoring instruction from the LAN by the discriminating circuit, controller sets this node into the LAN monitoring mode. When the communication right transfer instruction is discriminated by this node in the LAN monitoring mode, the controller indicates the change of the transmission right transfer destination to the upward node and, thereafter, sends the communication right transfer instruction to the downward node. With this system, even if the operating mode of the node connected to the LAN using the token passing method is changed from the normal operating mode to the LAN monitoring mode, the malfunction such as lost of the token does not occur, so that the network monitoring system with the high reliability can be realized.

5 Claims, 5 Drawing Sheets

MONITORING SYSTEM OF NETWORK

BACKGROUND OF THE INVENTION

1. Field of the Invention

The present invention relates to a monitoring system to monitor a network system in which a plurality of transmitting apparatuses are connected to a communication medium and information is transmitted.

2. Related Background Art

In recent years, various kinds of local area network systems (hereinafter, referred to as LAN) in which a plurality of business machines such as work stations, office computers, personal computers, etc. are connected by a common network transmission path have been put into practical use.

Hitherto, a special network monitoring system has been used as a tool to check the operation and to analyze the fault in the development of various kinds of connecting apparatuses for use in LAN and in the operation of the system.

FIG. 6 shows a conventional example of the connection between the LAN and the network monitoring apparatus. Generally, in the LAN, many token passing methods whereby only the apparatus which received the token as a well-known communication right transfer instruction can acquire the transmission right are used.

In FIG. 6, reference mumeral 1 denotes a network transmission path; 60a to 60d indicate transmitting apparatuses (hereinafter, referred to as nodes); and 61 represents a network monitor.

The network monitor 61 operates as one node on the network and is a special apparatus which is used for the monitor test to receive all of the data on the network, simulation test to communicate a message to the other arbitrary node through the network, and the like.

Therefore, a special monitoring apparatus must be purchased and installed, causing the overall costs to be raised and the installing space to be used wastefully.

To solve these disadvantages, there has also been developed a system having a structure such that the communication media monitoring function is also provided for the general node in place of the special monitoring apparatus.

However, the foregoing conventional systems have the following drawbacks.

There is an inconvenience such that when the operating mode of the node connected to the LAN is changed from the normal operating mode to the media monitoring operating mode, the token is temporarily lost.

In other words, according to the token passing method, the control information (communication right transfer instruction) indicative of the communication right acquisition permission called a token is circulated in the network and only the node which acquired the token or only the node designated by the token can obtain the transmission right. However, after the node is set into the media monitoring operating mode, it never performs the transmitting operation. Therefore, even if the token is given to this node, it does not transfer the token to the other node.

Consequently, when this node is seen from the other nodes, it is regarded as if the power source was disconnected. Therefore, the token lost recovery process is executed by the other node. During this recovery interval, the communication is stopped for a long time. On the other hand, complicated processing procedures are necessary even in the case of performing the recovery process

SUMMARY OF THE INVENTION

It is an object of the present invention to provide a monitoring system of a network in which even if the operating mode of the node connected to the LAN using the token passing method is changed from the normal operating mode to the media monitoring operating mode, a malfunction such as lost of the token does not occur and high reliability is obtained.

DETAILED DESCRIPTION OF THE EMBODIMENT

An embodiment according to the present invention will be described in detail hereinbelow with reference to the drawings. [Constitution of the embodiment (FIGS. 1 to 4)]

Figure 1:
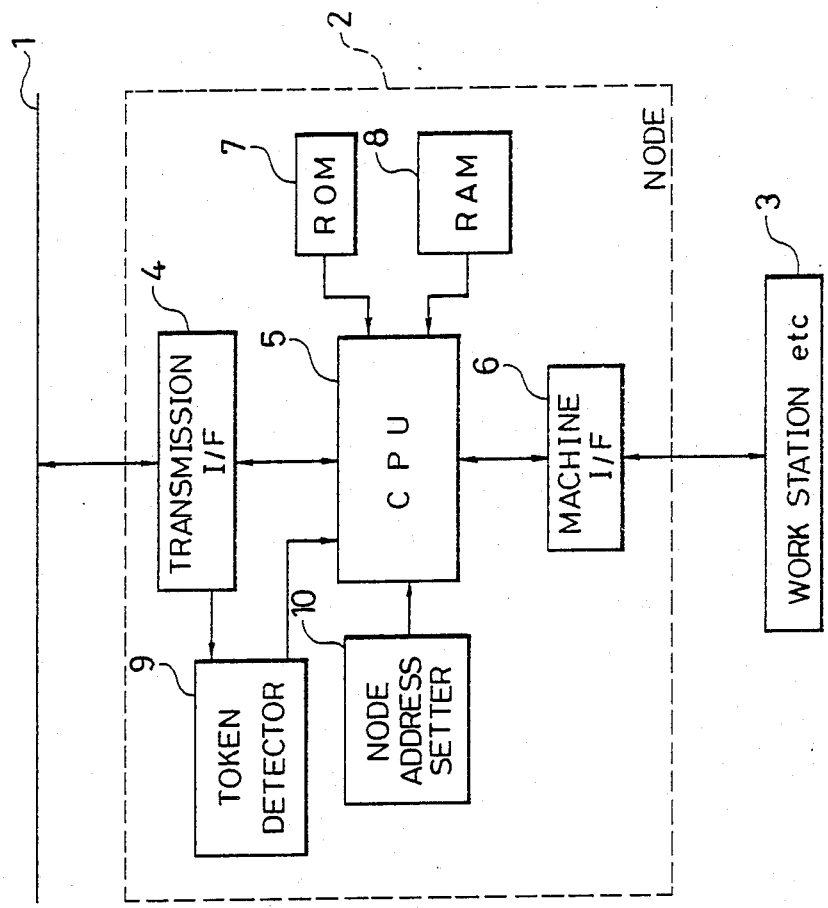
FIG. 1 is a block diagram of a node in an embodiment according to the present invention.

FIG. 1 shows an embodiment of a transmitting apparatus connected to a network system to which the invention is applied.

Figure 6:
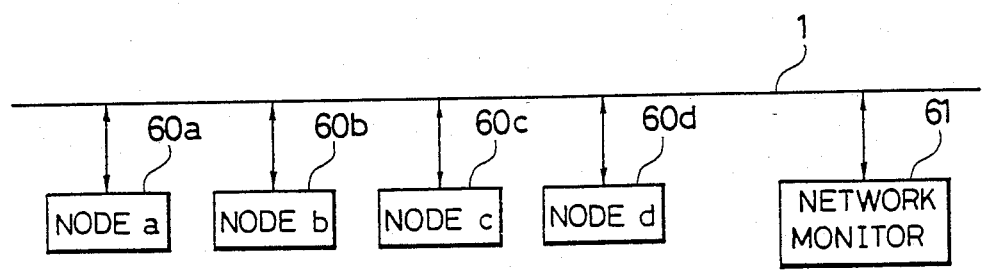
FIG. 6 is a conventional network system arrangement diagram.

In the diagram, a transmission path 1 serving as a communication medium is made of metal, optical fiber cable, or the like. Reference numeral 2 denotes a transmission/reception node similar to the nodes 60a to 60d shown in FIG. 6. Reference numeral 3 represents various kinds of business machines such as work station, office computer, personal computer, etc. One station is constructed by combining the node and business machines 3.

In the node 2, reference numeral 4 denotes a transmission interface consisting of a driver/receiver circuit for controlling the data input and output with the transmission path 1, a DMA controller, a data buffer, etc.; 5 indicates a CPU consisting of a microprocessor to perform the whole control of the node in accordance with a program shown in, e.g., FIG. 5 and stored in a ROM 7; 6 is a machine interface to execute the input/output control with the various kinds of business machines 3; 7 the ROM to store the transmission control program shown in FIG. 5, various kinds of parameters in the embodiment, and the like; 8 a random access memory (hereinafter, referred to as a RAM) to store various information; 9 a token detector to detect the token which is sent to the transmission path 1; and 10 a node address setter which consists of a dip switch and the like and sets the self node address.

Figure 2:
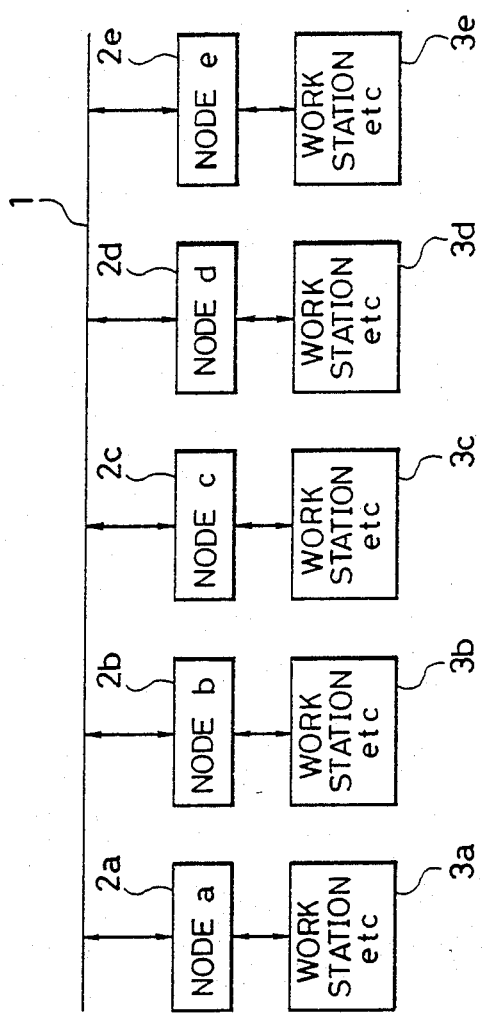
FIG. 2 is a network system arrangement diagram in an embodiment according to the invention.

FIG. 2 shows an arrangement of a network system consisting of a plurality of stations having the foregoing arrangement. In FIG. 2, reference numerals 2a to 2e denote nodes constituting the network and 3a to 3e represent various kinds of machines connected to the nodes 2a to 2e.

Figure 3:
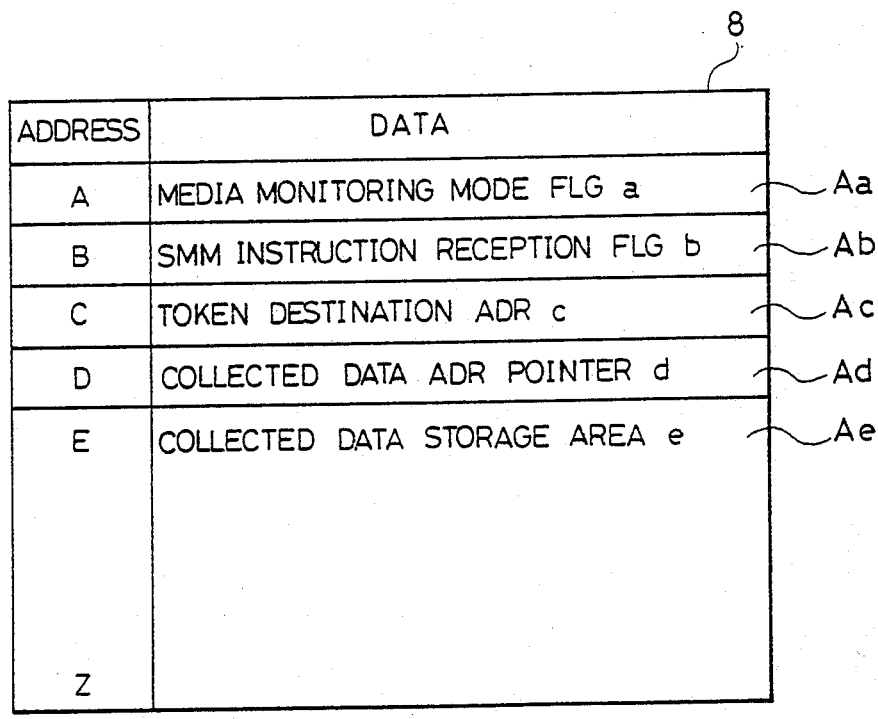
FIG. 3 is a diagram showing an area constitution in an RAM in the embodiment.

FIG. 3 is a diagram showing a part of memory areas assigned to the RAM 8. In the diagram, Aa denotes a media monitoring mode flag a which is set when the node operates in the media monitoring mode; Ab indicates an SMM instruction reception flag b which is set when a media monitoring mode setting instruction (hereinafter, referred to as an SMM instruction) to the self node is received; Ac is a token destination address c to store the destination address of the token; Ad is a collected data address pointer d indicative of the address in which the data collected in the media monitoring mode are stored; and Ae is a collected data storage area e to store the collected data. Start addresses of those areas in the RAM 8 are set to A, B, C, D, and E. Z represents a last address in the collected data storage area e.

Figure 4:
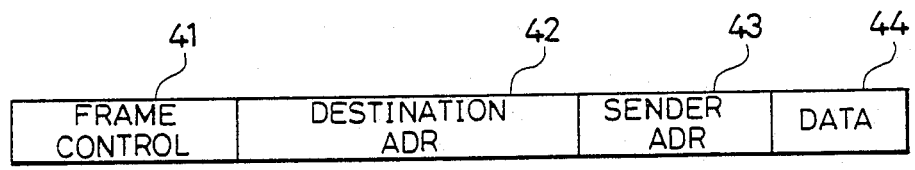
FIG. 4 is a transmission frame format diagram which is used in the embodiment.

FIG. 4 shows an example of a transmission frame format of the data which is used in this embodiment.

In the diagram, reference numeral 41 denotes a frame control region (FC) into which communication control instructions such as a communication right transfer instruction (token) and the like are written; 42 is a destination address region (DA); 43 a sender address region (SA); and 44 a data region (DT) into which various kinds of data are written.

[Operation of the embodiment (FIG. 5)]

An example of the communication media monitoring processes by the LAN in the embodiment with the foregoing constitution will now be described hereinbelow with reference to flowcharts of FIGS. 5A and 5B.

In the embodiment, it is assumed that the token is circulated in the network system shown in FIG. 2 in accordance with the order of the node $2a \rightarrow$ node $2b \rightarrow$ node $2c \rightarrow$ node $2d \rightarrow$ node $2e \rightarrow$ node $2a$.

Figure 5A:
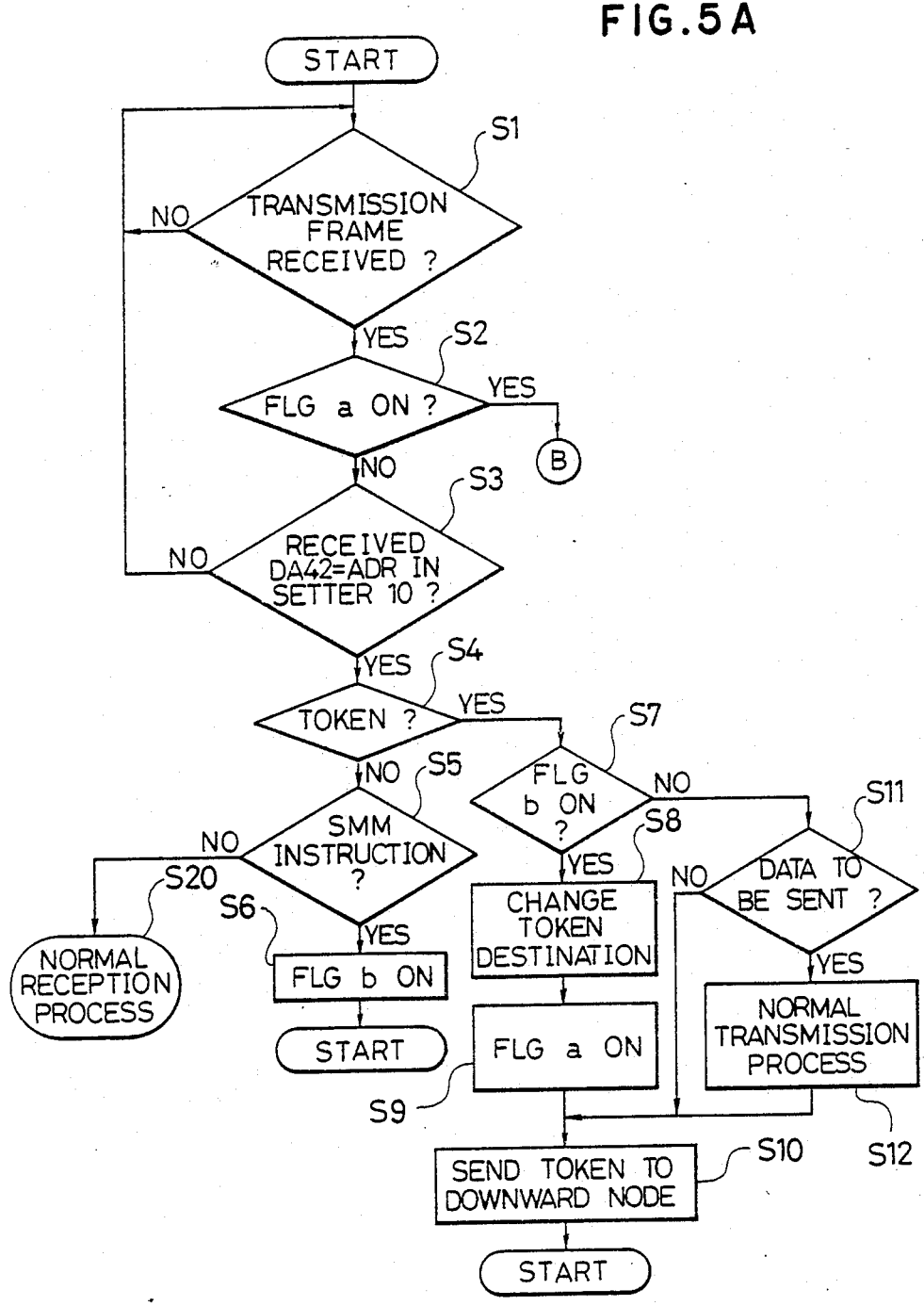
FIGS. 5A and 5B are flowcharts for the media monitoring processes in a transmitting apparatus in the embodiment.
Figure 5B:
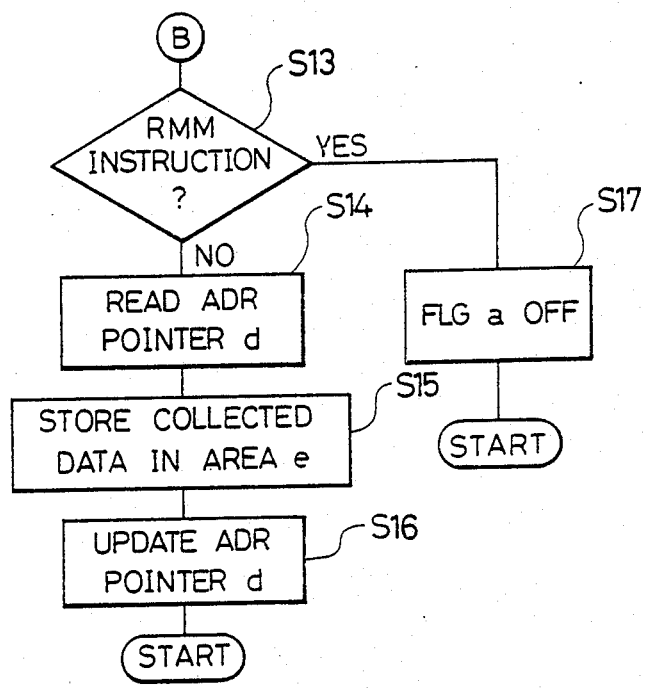

In general, the CPU 5 in the node 2 in FIG. 1 executes the following communication control processes in accordance with the programs shown in FIGS. 5A and 5B which have previously been stored in the ROM 7.

First, in FIG. 5A, a check is made to see if the transmission interface 4 has received the transmission frame from the transmission path 1 or not in step S1.

If the transmission frame has been received, step S2 follows and the current operating mode of the node 2 is checked by reading the media monitoring mode flag a from the RAM 8.

At the initializing stage of the node 2 (for instance, when the power source is turned on), the media monitoring mode flag a is reset. The content of the collected data address pointer d assumes that the start address E in the collected data storage area e has been set.

Therefore, since the media monitoring mode flag a is not set in step S2, the processing routine advances to step S3 and a check is made to see if the DA 42 of the received transmission frame coincides with the set value of the node address setter 10 or not. That is, a check is made to see if the received transmission frame is the transmission frame for the self node or not. If it is not the transmission frame for the self node and if the DA 42 does not coincide with the set value of the node address setter 10, nothing is performed but the processing routine is returned to step S1. If they coincide, this means that the transmission frame for the self node has been received, so that step S4 follows and a check is made by the token detector 9 whether the FC 41 is the token code or not. If YES in step S4, this means that this node acquired the communication right and the reception of the token is informed to the CPU 5. When the CPU 5 knows of the reception of the token, the processing routine advances to step S7 and a check is made to see if an SMM instruction reception flag, which will be explained hereinafter, has been set or not. Since the SMM instruction reception flag is not generally set, step S11 follows. In step S11, checks are made to see if a transmission request has been sent from the machine 3 connected to the self node and to see if the data to be transmitted exists or not. If the transmission request has been generated, step S12 follows and the normal transmission process is executed. After completion of the execution of the normal transmission process, step S10 follows.

On the other hand, if no transmitting data exists in step S11, step S10 follows and the token is sent to the downward node indicated by the token destination address c in the RAM 8 and the processing routine is returned to step S1.

As mentioned above, the operations when the node 2 is set into the normal operating mode are executed.

The processes when the operating mode of the node $2b$ is changed from the normal operating mode to the media monitoring mode will now be explained with reference to the flowchart of FIG. 5A.

In the node $2b$, when the SMM instruction is detected in step S5, step S6 follows and the SMM instruction reception flag b in the RAM 8 is set. Thereafter, the processing routine is returned to step S1 and the apparatus waits for the reception of the token to the self node.

Thereafter, when the token to the self node is detected in step S4 through steps S2 and S3, a check is made in step S7 to see if the SMM instruction reception flag b in the RAM 8 has been set or not.

If the flag b has been set, step S8 follows and the token destination change (from the node $2b$ to the node $2c$) is instructed to the upward node (the node $2a$). The token destination change is realized by the following manner. Namely, the address of the node $2a$ is written into the DA 42. The self node address value (node $2b$) is written into the SA 43. The transmission frame in which the address of the node $2c$ as the downward node of the self node is sent to the DT44. In the next step S9, the media monitoring mode flag a in the RAM 8 is set and step S10 then follows. In step S10, the token is sent to the downward node (the node $2c$) and thereafter, the processing routine is returned to step S1. ° After that, when the node $2b$ receives the transmission frame in step S1, step S13 shown in FIG. 5B follows step S2 because the media monitoring mode flag a has been set in this case. In the step S13, the FC 41 of the received transmission frame is checked to see if the FC 41 is a media monitoring mode cancelling instruction (hereinafter, referred to as an RMM instruction) code or not. If NO in step S13, step S14 follows and the collected data storing process from the transmission medium is then executed.

First, in step S14, the collected data address pointer d is read out of the RAM 8. In the next step S15, the address to store the collected data is set in the RAM 8. The collected data is stored into the collected data storage area e. Further, in step S16, the content of the collected data address pointer d is updated by advancing its storage address to the address into which the next collected data should be stored. In this case, if the address exceeds the last address Z in the storage area e, the address is returned to the start address E.

Parts of the FC 41, DA 42, SA 43, and DT 44, and the like of the received transmission frame are included in the content of the collected data.

The data transmitted by the transmission path is successively stored into the collected data storage area e irrespective of the destination address by the foregoing processes.

By reading out the collected data stored as mentioned above to the outside at a proper time point, they can be used as useful analysis information.

On the other hand, since when the operating mode of the node 2b is changed from the normal operating mode to the media monitoring mode, the token destination change is instructed to the node 2a as the upward node. Thus, the malfunction such as loss of the token does not occur.

The operating mode of the node 2b can be also returned from the media monitoring mode to the normal operating mode.

In such a case, the RMM instruction is indicated to the node 2b. In the node 2b, when the reception of the RMM instruction is detected in step S13, step S17 follows and the media monitoring mode flag a is reset. Then, the processing routine is returned to step S1. Therefore, when the transmission frame is received after that, the normal reception process is executed since the media monitoring mode flag a has been reset.

Since the token is circulated after the elapse of a constant period of time in a manner similar to the case where the node newly enters the network at the normal turn-on of the power source, there is no need to perform any special process.

As explained above, according to the present invention, when the operating mode of the node connected to the LAN using the token passing method is changed from the normal operating mode to the media monitoring mode, the destination change of the token is instructed to the upward node. Accordingly, since the malfunction such as loss of the token does not occur, the network monitoring system with high reliability can be provided.

What is claimed is:

1. A network monitoring system in which a plurality of data transmitting apparatuses are connected to a communication medium and only one of said plurality of data transmitting apparatuses to which a communication right was transferred can acquire a transmission right of data, each of said plurality of data transmitting apparatuses being capable of operating in a normal operating mode and a communication medium monitoring mode, wherein each data transmitting apparatus can receive and transmit data in the normal mode, and can receive data determined to be transmitted to any one of said plurality of data transmitting apparatuses but cannot transmit data in the communication medium monitoring mode, each of said plurality of data transmitting apparatus comprising:

first discriminating means for discriminating, in the normal operating mode, whether received data is addressed to said data transmitting apparatus;

second discriminating means for discriminating whether the received data discriminated to be addressed to said data transmitting apparatus by said first discriminating means includes a communication right transfer instruction;

memory means for discriminating and storing a communication medium monitoring instruction; and control means for, when the communication medium monitoring instruction is stored in said memory means, changing from the normal operating mode to the communication medium monitoring mode, transmitting the communication right transfer instruction to a downward data transmitting apparatus, and instructing an upward data transmitting apparatus previously having said data transmitting apparatus as the destination of the communication right transfer instruction to change the destination of the communication right transfer instruction.

2. A monitoring system according to claim 1, wherein each said data transmitting apparatus further comprises third discriminating means for discriminating the mode of said data transmitting apparatus.

3. A monitoring system according to claim 1, wherein each said data transmitting apparatus further comprises means for instructing recovery from the communication medium monitoring mode to the normal operating mode.

4. A monitoring system according to claim 1, wherein each said data transmitting apparatus further comprises additional memory means for storing data collected in the communications medium monitoring mode.

5. In a network monitoring system in which a plurality of data transmitting apparatuses are connected to a communication medium and only one of said plurality of transmitting apparatuses to which a communication right was transferred can acquire a transmission right of data, each of said plurality of data transmitting apparatuses being capable of operating in a normal operating mode and a communication medium monitoring mode, wherein each data transmitting apparatus can receive and transmit data in the normal mode, and can receive data determined to be transmitted to any one of said plurality of data transmitting apparatuses but can not transmit data in the communication medium monitoring mode, a method of changing from the normal operating mode to the communication medium monitoring mode in each of said plurality of data transmitting apparatus, comprising the steps of:

receiving data;

discriminating the mode of said data communication apparatus;

discriminating in the normal operating mode whether the received data is addressed to said data transmitting apparatus;

discriminating whether a communication medium monitoring instruction is stored when the data includes the communication right transfer instruction; and when the communication medium monitoring instruction is stored, instructing an upward data transmitting apparatus which previously had the data transmitting apparatus as the destination of the communication right transfer instruction to change the destination of the communication right transfer instruction, transmitting the communication right transfer instruction to a downward data transmitting apparatus and changing from the normal operating mode to the communication medium monitoring mode.

* * * * *

UNITED STATES PATENT AND TRADEMARK OFFICE
CERTIFICATE OF CORRECTION

PATENT NO. : 4,891,639
DATED : January 2, 1990
INVENTOR(S) : YASUO NAKAMURA

It is certified that error appears in the above-identified patent and that said Letters Patent is hereby corrected as shown below: Title page:

AT [57] ABSTRACT

Line 25, "lost" should read --loss--.

COLUMN 2

Line 44, "node" should read --node 2--.

COLUMN 6

Line 26, "communications" should read --communication--.

Signed and Sealed this

Fifteenth Day of October, 1991

Attest:

HARRY F. MANBECK, JR.

*Attesting Officer*   *Commissioner of Patents and Trademarks*